(12) United States Patent
Park et al.

(10) Patent No.: US 10,065,389 B2
(45) Date of Patent: Sep. 4, 2018

(54) VACUUM INSULATION PANEL AND REFRIGERATOR INCLUDING THE SAME

(71) Applicants: Samsung Electronics Co., Ltd., Gyeonggi-do (KR); CJ Cheiljedang Corporation, Seoul (KR)

(72) Inventors: Jong Sung Park, Seoul (KR); Seung Hoon Kal, Gyeonggi-do (KR); Hyung Sung Kim, Gyeonggi-do (KR); Jin Hyun Park, Gyeonggi-do (KR); Young Sung Jung, Gyeonggi-do (KR); Young Joon Kim, Seoul (KR); Chan Suk Yoon, Seoul (KR)

(73) Assignees: SAMSUNG ELECTRONICS CO., LTD., Suwon-si (KR); CJ CHEILJEDANG CORPORATION, Seoul (KR)

( * ) Notice: Subject to any disclaimer, the term of this patent is extended or adjusted under 35 U.S.C. 154(b) by 122 days.

(21) Appl. No.: 15/092,529

(22) Filed: Apr. 6, 2016

(65) Prior Publication Data

US 2016/0288448 A1    Oct. 6, 2016

(30) Foreign Application Priority Data

Apr. 6, 2015 (KR) .................. 10-2015-0048178

(51) Int. Cl.
*B32B 3/02* (2006.01)
*B32B 3/08* (2006.01)
(Continued)

(52) U.S. Cl.
CPC .................. *B32B 3/08* (2013.01); *B32B 3/00* (2013.01); *B32B 3/06* (2013.01); *B32B 3/28* (2013.01);
(Continued)

(58) Field of Classification Search
None
See application file for complete search history.

(56) References Cited

U.S. PATENT DOCUMENTS 4,444,821 A * 4/1984 Young .................... B29C 70/00
                                                        220/592.27
2004/0074208 A1    4/2004 Olson et al.
(Continued)

FOREIGN PATENT DOCUMENTS

JP    S55145233 A    11/1980
JP    404266696 A    9/1992
(Continued)

OTHER PUBLICATIONS

European Search Report, Application/Patent No. 16163742.6-1605, dated Aug. 8, 2016, 8 pages, European Patent Office, Munich, Germany.
(Continued)

*Primary Examiner* — Adam Krupicka

(57) ABSTRACT

Disclosed herein are a vacuum insulation panel having an improved structure which may improve durability by minimizing a folding process, and a refrigerator including the same.
The vacuum insulation panel includes a core material, a first outer skin material that is arranged to form an outer surface of the core material, a second outer skin material that has a gap and forms the other outer surface of the core material, and is disposed to face the first outer skin material, and a third outer skin material that is provided to connect the first outer skin material and the second outer skin material and to be variable in accordance with the gap.

20 Claims, 21 Drawing Sheets

(51) Int. Cl.
- *B32B 3/28* (2006.01)
- *B32B 7/04* (2006.01)
- *B32B 7/12* (2006.01)
- *F25D 23/06* (2006.01)
- *B32B 3/00* (2006.01)
- *B32B 5/02* (2006.01)
- *B32B 15/04* (2006.01)
- *B32B 15/08* (2006.01)
- *B32B 15/14* (2006.01)
- *B32B 27/06* (2006.01)
- *B32B 27/12* (2006.01)
- *B32B 3/06* (2006.01)

(52) U.S. Cl.
CPC ............... *B32B 5/024* (2013.01); *B32B 7/04* (2013.01); *B32B 7/12* (2013.01); *B32B 15/04* (2013.01); *B32B 15/08* (2013.01); *B32B 15/14* (2013.01); *B32B 27/06* (2013.01); *B32B 27/12* (2013.01); *F25D 23/06* (2013.01); *F25D 23/063* (2013.01); *B32B 2250/44* (2013.01); *B32B 2255/205* (2013.01); *B32B 2262/00* (2013.01); *B32B 2262/101* (2013.01); *B32B 2264/102* (2013.01); *B32B 2307/304* (2013.01); *B32B 2307/7242* (2013.01); *B32B 2307/7265* (2013.01); *B32B 2509/10* (2013.01); *B32B 2607/00* (2013.01); *F25D 2201/10* (2013.01); *F25D 2201/122* (2013.01); *F25D 2201/124* (2013.01); *F25D 2201/14* (2013.01)

(56) References Cited

U.S. PATENT DOCUMENTS

| | | | |
|---|---|---|---|
| 2009/0031659 A1 | 2/2009 | Kalfon | |
| 2013/0084445 A1* | 4/2013 | Haley | D04H 13/008 428/219 |
| 2013/0200084 A1* | 8/2013 | Jung | E04B 1/803 220/592.09 |

FOREIGN PATENT DOCUMENTS

| | | |
|---|---|---|
| JP | 2006029448 A | 2/2006 |
| JP | 2010203538 A | 9/2010 |

OTHER PUBLICATIONS

Foreign Communication from Related Counterpart Application; European Patent Application No. 16163742.6; Written Opinion of the European Patent Convention dated May 23, 2017; 5 pages.

* cited by examiner

VACUUM INSULATION PANEL AND REFRIGERATOR INCLUDING THE SAME

CROSS-REFERENCE TO RELATED APPLICATION AND CLAIM OF PRIORITY

This application claims the benefit of Korean Patent Application No. 10-2015-0048178, filed on Apr. 6, 2015 in the Korean Intellectual Property Office, the disclosure of which is incorporated herein by reference.

FIELD

Embodiments of the present disclosure relate to a vacuum insulation panel and a refrigerator including the same, and more particularly, to a vacuum insulation panel having an improved structure, which may improve durability by minimizing a folding process, and a refrigerator including the same.

BACKGROUND

Energy consumed by humanity is limited, and global warming due to carbon dioxide generated as a result of the consumption of the limited energy is the biggest problem which humanity has along with the energy crisis. Accordingly, energy regulations of each country are being strengthened day by day, and an energy rating system for household appliances is a permanent assignment which manufacturers face. Information of the energy rating system requiring maximum efficiency with less energy is in good agreement with the needs of consumers who require a high appropriate content amount and low power consumption. In particular, a lot of research on refrigerators has been conducted over the past several decades, and research on efficiency improvement for a cooling cycle, a compressor, a heat exchanger, and the like has already reached its limit. Accordingly, in recent years, research on heat loss has been mainly conducted, and a lot of attempts have been made to increase energy efficiency by enhancing insulating performance of refrigerators.

An existing heat insulating material such as polyurethane has a thermal conductivity of about 20 mK/m·K, and when using this, the thickness of an outer wall of a refrigerator is increased, resulting in a reduction of the storage capacity of the refrigerator. Accordingly, the use of a vacuum insulation panel having excellent heat insulating performance is required in order to solve this problem.

However, a heat bridge phenomenon (a phenomenon in which heat flows through edges of the vacuum insulation panel) and durability of the vacuum insulation panel are in conflict with each other, and therefore there is a limit in efficiently manufacturing the vacuum insulation panel.

SUMMARY

Therefore, it is an aspect of the present disclosure to provide a vacuum insulation panel having an improved structure, which may improve durability by minimizing a folding process, and a refrigerator including the same.

It is another aspect of the present disclosure to provide a vacuum insulation panel having an improved structure, which may prevent a heat bridge phenomenon and improve durability, and a refrigerator including the same.

It is still another aspect of the present disclosure to provide a vacuum insulation panel which may reduce a defect such as breakage of a core material or the like caused by forcible compression of the core material which occurs in an existing non-folding process in which the core material is mechanically compressed and at the same time inserted into an outer skin material when the vacuum insulation panel is manufactured, and thereby improve the quality of the vacuum insulation panel, and a refrigerator including the same.

Additional aspects of the disclosure will be set forth in part in the description which follows and, in part, will be obvious from the description, or may be learned by practice of the disclosure.

In accordance with one aspect of the present disclosure, a vacuum insulation panel includes: a core material; a first outer skin material that is arranged to form an outer surface of the core material; a second outer skin material that has a gap and forms the other outer surface of the core material, and is disposed to face the first outer skin material; and a third outer skin material that is provided to connect the first outer skin material and the second outer skin material and to be variable in accordance with the gap.

Here, the third outer skin material may include a first connection portion that is formed to be connected to the first outer skin material and a second connection portion that is formed to be connected to the second outer skin material, and the first connection portion and the second connection portion are provided to be overlapped with each other.

Also, the first connection portion and the second connection portion may include a creased line that is formed therebetween.

Also, the creased line may be provided to be positioned at any one of an inner side and an outer side of the first outer skin material and the second outer skin material.

Also, the third outer skin material may be formed as a pair so as to form at least two side surfaces of a plurality of surfaces.

Also, the third outer skin material may include a wrinkled portion.

Also, the third outer skin material may include at least one of a metal foil outer skin material and a metal vapor-deposited outer skin material.

Also, the first outer skin material and the second outer skin material may include any one of a metal foil outer skin material, a metal vapor-deposited outer skin material, an organic coated outer skin material, an inorganic coated outer skin material, and an organic and inorganic hybrid coated outer skin material.

Also, the first outer skin material may include any one of a metal foil outer skin material, a metal vapor-deposited outer skin material, an organic coated outer skin material, an inorganic coated outer skin material, and an organic and inorganic hybrid coated outer skin material.

Also, the second outer skin material may include any one of a metal foil outer skin material, a metal vapor-deposited outer skin material, an organic coated outer skin material, an inorganic coated outer skin material, and an organic and inorganic hybrid coated outer skin material.

Also, the core material may include any one of organic fibers and inorganic fibers.

Also, a length of the core material may be in the range of 0.1 to 300 mm, and a diameter of the core material may be in the range of 0.1 to 10 um.

Also, the vacuum insulation panel may further include an adsorbent that is provided inside the core material and adsorbs at least one of gas and moisture flowing into the core material.

Also, in the adsorbent, calcium oxide (CaO) may be included at 50% or less of a weight of the vacuum insulation panel.

Also, the first outer skin material, the second outer skin material, and the third outer skin material may be adhered to one another by fusion or adhesion.

In accordance with another aspect of the present disclosure, a vacuum insulation panel includes: a core material; a first outer skin material that is disposed outside the core material; and a second outer skin material that is coupled to the first outer skin material to form a receiving space inside of which the core material is accommodated, wherein the second outer skin material is formed with a different size from a size of the first outer skin material, and includes a creased portion that is provided to enable the size of the second outer skin material to be variable.

Here, the first outer skin material and the second outer skin material may be adhered to each other along edges of the first outer skin material by fusion or adhesion.

Also, the creased portion may include a first connection portion, a second connection portion that is connected to the first connection portion, and a creased line that is formed between the first connection portion and the second connection portion.

Also, the first connection portion and the second connection portion may be formed so as to be overlapped with each other with respect to the creased line.

Also, the creased line may be positioned outside the second outer skin material.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, a preferred embodiment of the present invention will be described in detail with reference to the accompanying drawings. Moreover, terms used in the description below such as "distal end", "rear end", "upper portion", "lower portion", "top", "bottom", and the like are defined on the basis of the drawings, and the shape and position of each component is not limited by these terms.

Figure 1:
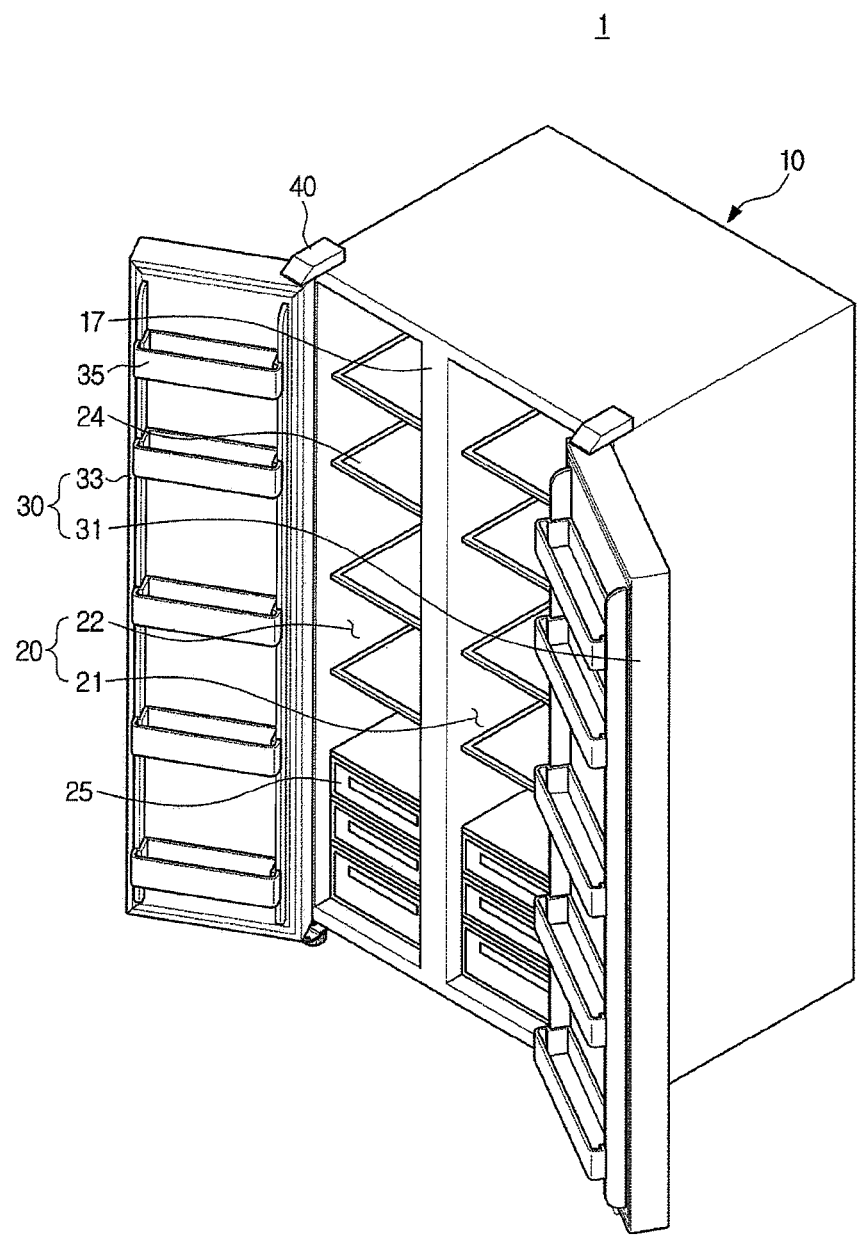
FIG. 1 is a perspective view showing an exterior appearance of a refrigerator in accordance with one embodiment of the present disclosure.
Figure 2:
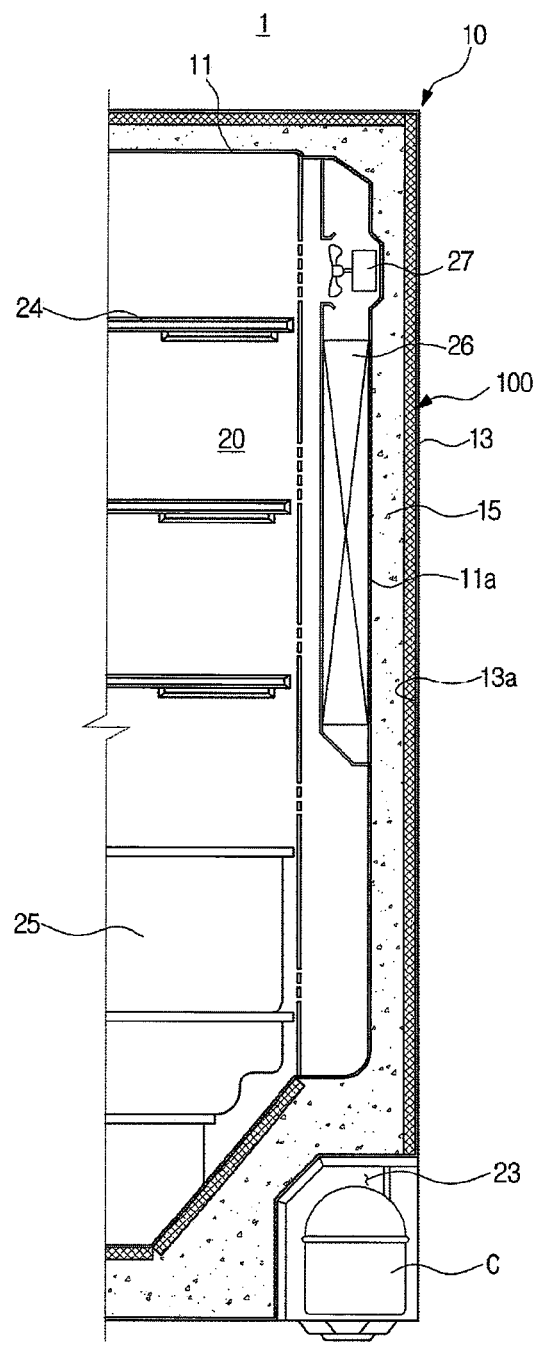
FIG. 2 is a cross-sectional view showing a refrigerator in accordance with one embodiment of the present disclosure.
Figure 3:
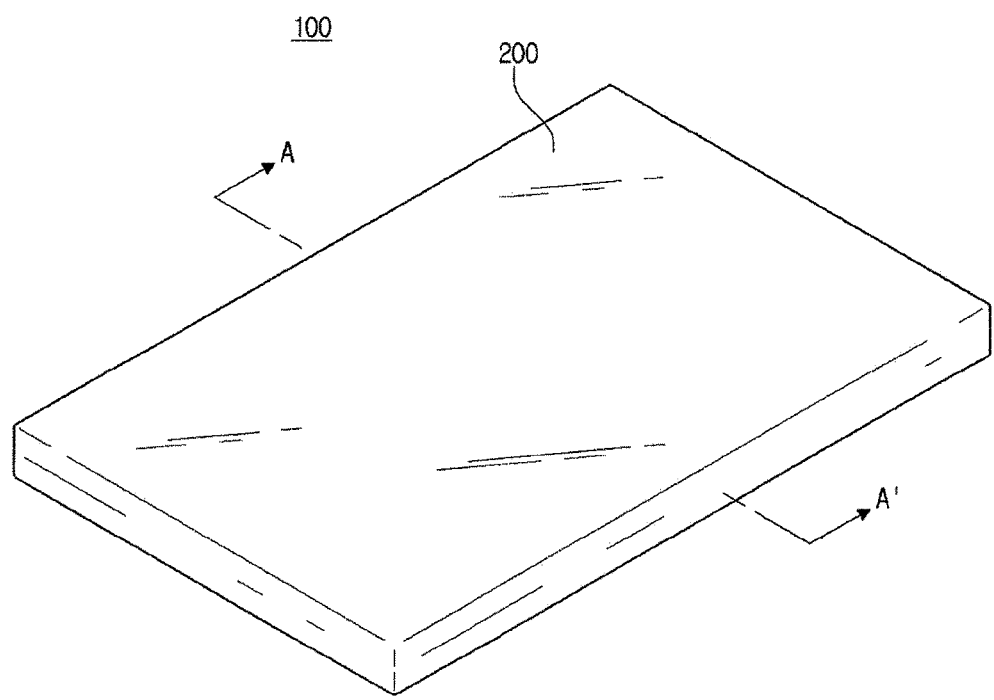
FIG. 3 is a perspective view showing a vacuum insulation panel in accordance with one embodiment of the present disclosure.
Figure 4:
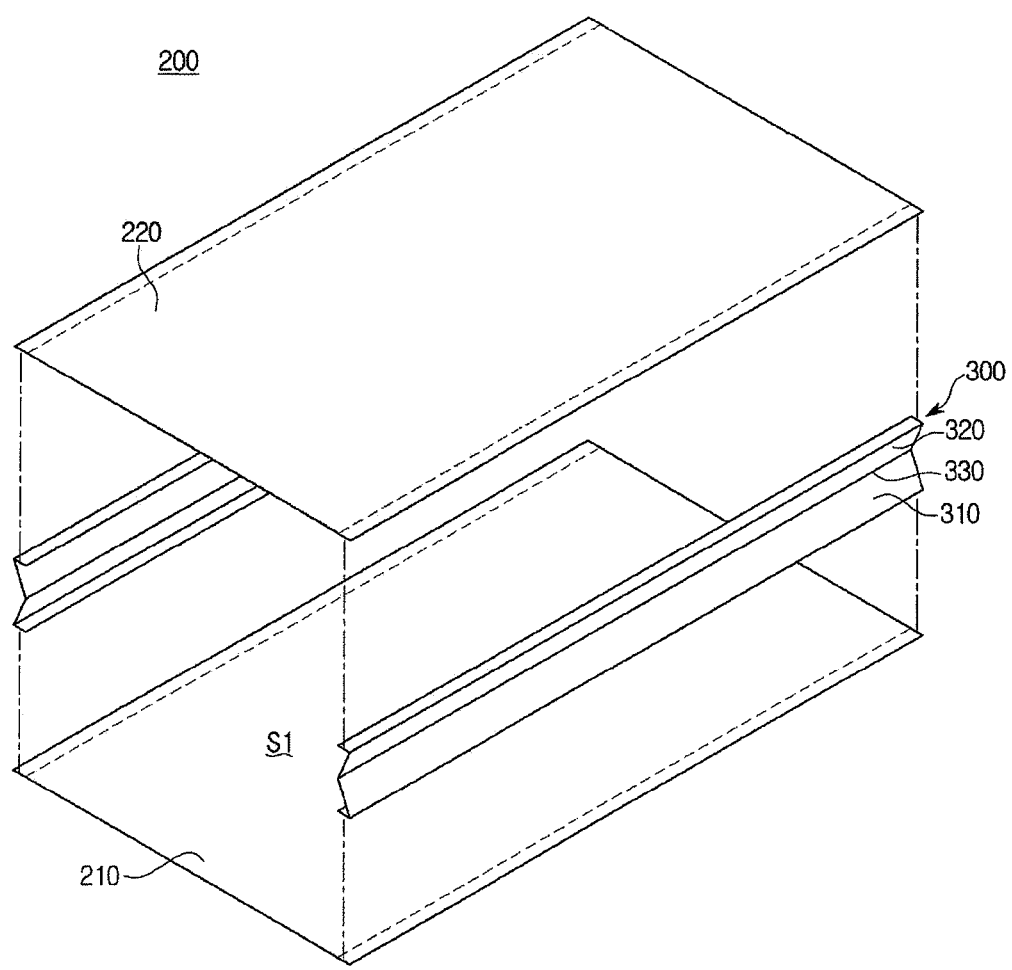
FIG. 4 is an exploded perspective view showing an outer skin material of a vacuum insulation panel in accordance with one embodiment of the present disclosure.
Figure 5:
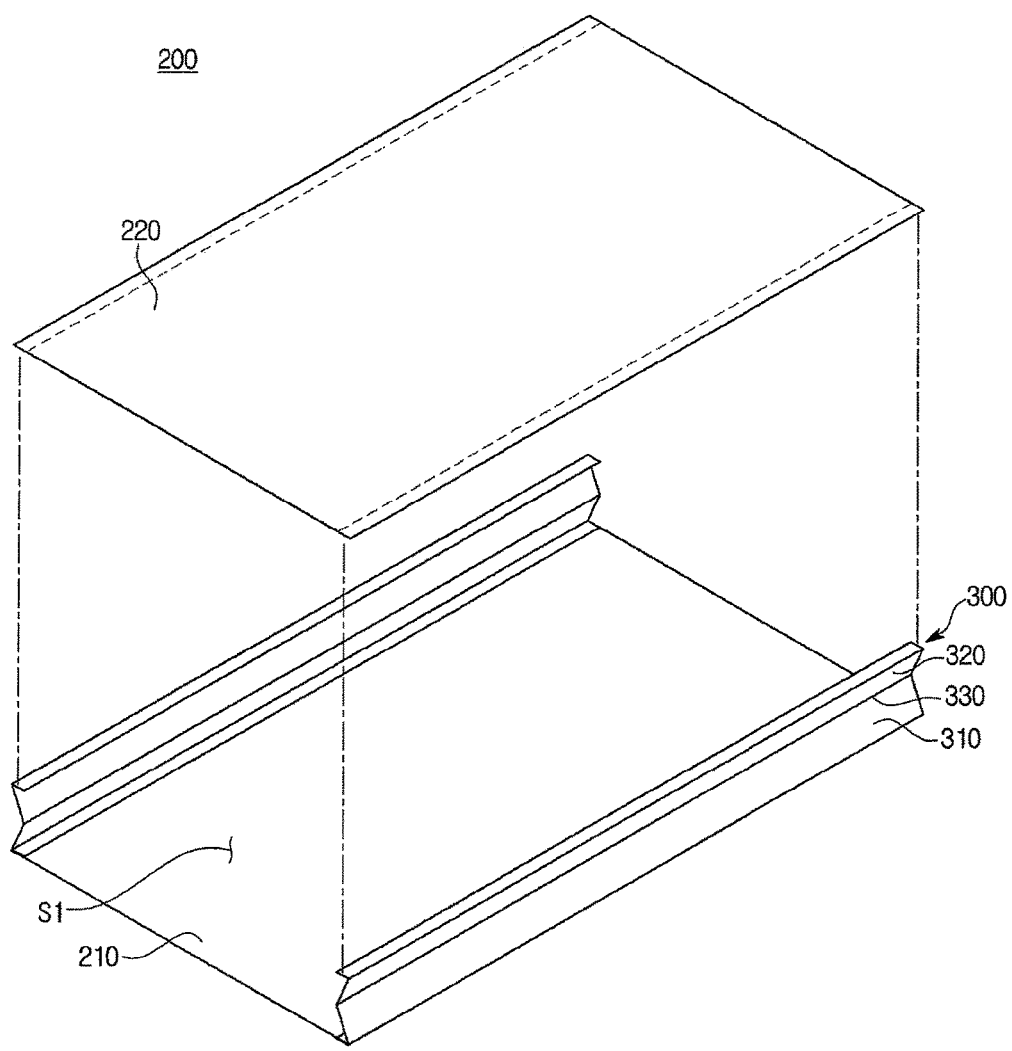
FIG. 5 a view showing a state before an outer skin material of a vacuum insulation panel in accordance with one embodiment of the present disclosure is coupled.
Figure 6:
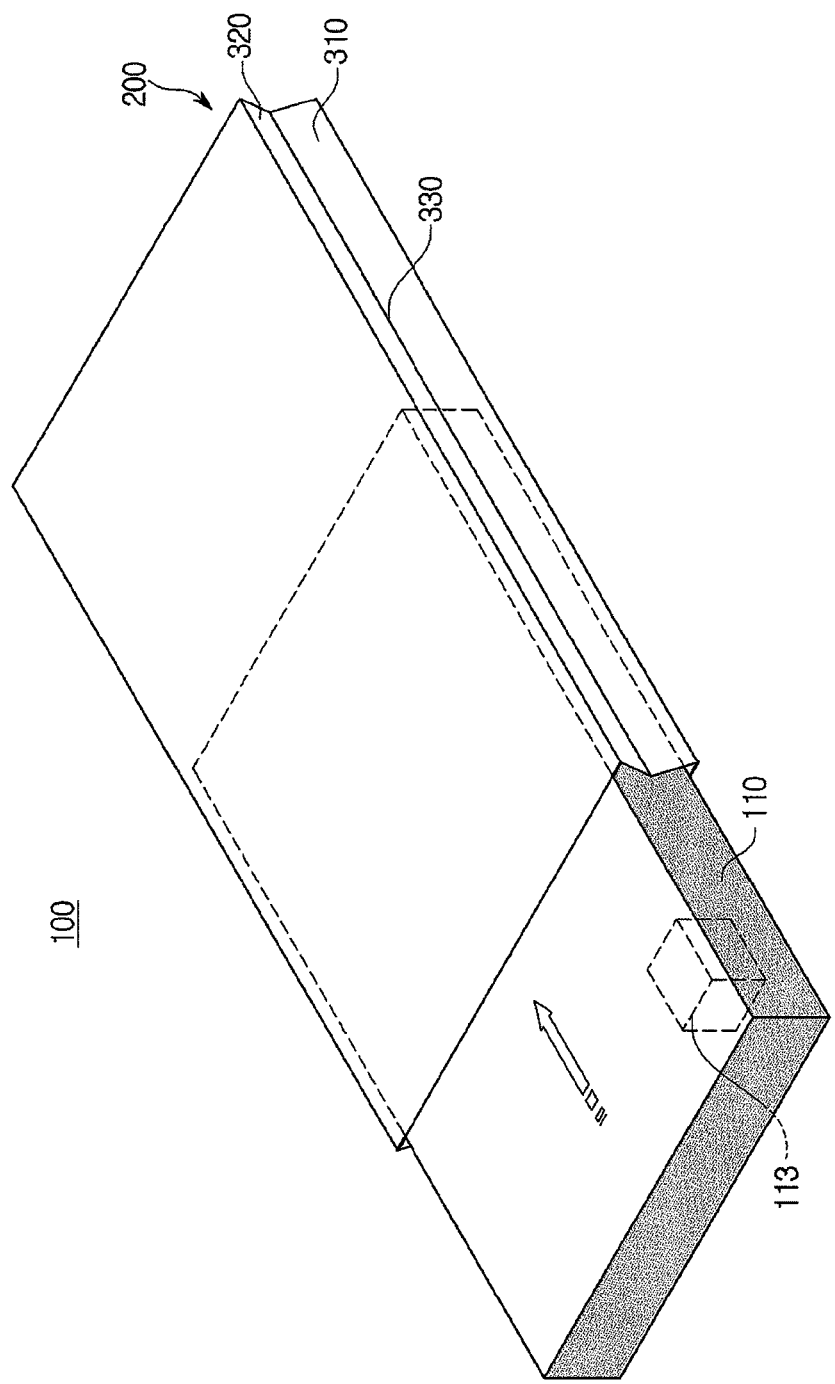
FIG. 6 is a view showing a state in which a core material is inserted into an outer skin material of a vacuum insulation panel in accordance with one embodiment of the present disclosure.
Figure 7:
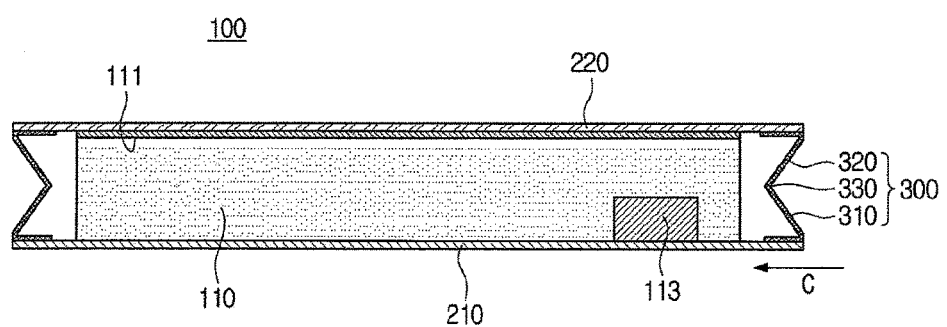
FIG. 7 is a view showing a pre-vacuuming state of a vacuum insulation panel in accordance with one embodiment of the present disclosure.
Figure 8:
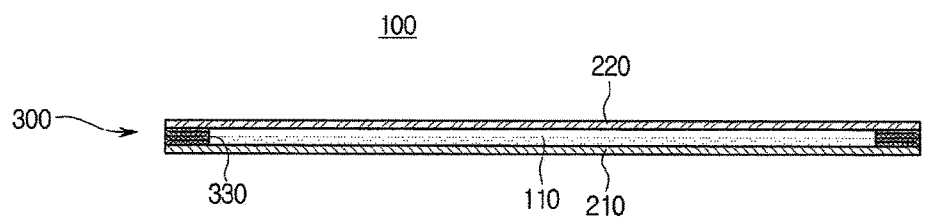
FIG. 8 is a cross-sectional view taken along line A-A' of FIG. 3.

FIG. 1 is a perspective view showing an exterior appearance of a refrigerator in accordance with one embodiment of the present disclosure, FIG. 2 is a cross-sectional view showing a refrigerator in accordance with one embodiment of the present disclosure, and FIG. 3 is a perspective view showing a vacuum insulation panel in accordance with one embodiment of the present disclosure.

As shown in FIGS. 1 to 3, a refrigerator 1 may include a main body 10 that forms an exterior appearance of the refrigerator 1 and a storage compartment 20 that is provided in the main body 10 to have an open front surface.

The main body 10 may include an inner case 11 that forms the storage compartment 20, an outer case 13 that forms the exterior appearance, and a cool air supplying apparatus (not shown) that supplies the storage compartment 20 with cool air.

The cool air supplying apparatus may include a compressor C, a condenser (not shown), an expansion valve (not shown), an evaporator 26, a blower fan 27, and the like, and a foam heat insulating material 15 may be foamed between the inner case 11 and the outer case 13 of the main body 10 to prevent cool air of the storage compartment 20 from being discharged.

A machine room 23 is provided at a lower rear portion of the main body 10 such that the compressor C for compressing a refrigerant and the condenser for condensing the compressed refrigerant are installed therein.

The storage compartment 20 may be partitioned into left and right sides by a partition wall 17, a refrigerator compartment 21 may be provided at the right side of the main body 10, and a freezer compartment 22 may be provided at the left side of the main body 10.

The refrigerator 1 may further include a door 30 that opens and closes the storage compartment 20.

The refrigerator compartment 21 and the freezer compartment 22 may be respectively opened and closed by a refrigerator door 31 and a freezer door 33 which are rotatably coupled to the main body 10, and a plurality of door guards 35 to accommodate food or the like may be provided at rear surfaces of the refrigerator door 31 and the freezer door 33.

A plurality of shelves 24 may be provided in the storage compartment 20 to divide the storage compartment 20 into a plurality of sections, and articles such as food may be loaded on the shelves 24.

In addition, a plurality of storage boxes 25 may be provided to be taken in and out of the storage compartment 20 in a slidable manner.

The refrigerator 1 may include a hinge 40 that allows the door 30 to be rotatably coupled to the main body 10.

A foaming space S is provided between the inner case 11 that forms the storage compartment 20 and the outer case 13 coupled to the outer side of the inner case 11 to form the exterior appearance, and a foam heat insulating material 15 is filled inside the foaming space S.

In order to enhance a heat insulating property of the foam heat insulating material 15, a vacuum insulation panel (also referred to as VIP) 100 may be filled together with the foam heat insulating material 15.

The vacuum insulation panel 100 is constituted of a core material 110 and an outer skin material 200.

The outer skin material 200 is a very important material for maintaining the life of the vacuum insulation panel 100 by preventing minute gas and moisture from penetrating into the inside of the vacuum insulation panel 100 in a vacuum state.

The core material 110 may include glass fibers having excellent heat insulating performance. In this instance, the core material 110 may obtain a high heat insulating effect when it has a structure in which panels woven by glass fibers, which are as thin as possible, are laminated onto one another. Specifically, as a pore size between the glass fibers shrinks, it is possible to minimize the effect of radiation that is the heat insulating performance, and therefore the high heat insulating effect may be expected.

The core material 110 may include any one of organic fibers and inorganic fibers.

The length of the core material 110 may be in the range of 0.1 to 300 mm, and the diameter thereof may be in the range of 0.1 to 10 um.

The outer skin material 200 of the vacuum insulation panel 100 may include a first outer skin material 210, a second outer skin material 220, and a third outer skin material 300.

The first outer skin material 210 may be disposed outside the core material 110. The second outer skin material 220 may be disposed to be spaced apart from and facing the first outer skin material 210. The third outer skin material 300 may be provided to connect the first outer skin material 210 and the second outer skin material 220.

The first outer skin material 210, the second outer skin materials 220, and the third outer skin material 300 may be coupled to each other to form a receiving space S1 in which the core material 110 is accommodated.

The first outer skin material 210, the second outer skin material 220, and the third outer skin material 300 may be adhered to one another by fusion or adhesion. When the first outer skin material 210, the second outer skin material 220, and the third outer skin material 300 are adhered to one another by fusion or adhesion, a gap or a passage through which at least one of gas and moisture can be moved may be closed, and therefore the permeation of the at least one of gas and moisture to the core material 110 may become difficult. Accordingly, the durability of the vacuum insulation panel 100 may be improved. In addition, by adhering the first outer skin material 210, the second outer skin material 220, and the third outer skin material 300 to one another by fusion and adhesion, it is possible to improve the manufacturability of the vacuum insulation panel 100. That is, when the outer skin material 200 of the vacuum insulation panel 100 is broken, it is generally difficult to maintain the vacuum state of the receiving space S1 in which the core material 110 is accommodated. However, when the first outer skin material 210 and the second outer skin material 220 are adhered to each other by fusion or adhesion, it is possible to maintain the vacuum state of the receiving space S1 in which the core material 110 is accommodated even though the outer skin material 200 of the vacuum insulation panel 100 is broken in the manufacturing process.

The first outer skin material 210 may be adhered to an inner surface 13a of the outer case 13. The first outer skin material 210 having low thermal conductivity may be adhered to the inner Surface 13a of the outer case 13, so that the heat insulating performance may be improved and external moisture and gas may be prevented from flowing into the vacuum insulation panel 100. In addition, an outer surface of the first outer skin material 210 facing the inner surface 13a of the outer case 13 is flat, so that the adhesion of the first outer skin material 210 to the inner surface 13a of the outer case 13 is facilitated.

However, the present disclosure is not limited to the adhesion of the first outer skin material 210 to the inner surface 13a of the outer case 13, and the second outer skin material 220 other than the first outer skin material 210 may be adhered to the inner surface 13a of the outer case Meanwhile, the third outer skin material 300 may be provided so as to be variable so that the length thereof may be adjusted.

In FIGS. 4 to 8, a vacuum insulation panel formed by an outer skin material in accordance with one embodiment of the present disclosure is disclosed.

As shown in FIGS. 4 to 8, an outer skin material 200 of a vacuum insulation panel 100 includes a first outer skin material 210, a second outer skin material 220, and a third outer skin material 300.

The first outer skin material 210 is disposed on one surface of a core material 110, and the second outer skin material 220 is disposed on an outer surface thereof so as to face the first outer skin material 210. The first outer skin material 210 and the second outer skin material 220 may be formed of different kinds of material from each other.

The first outer skin material 210, the second outer skin material 220, and the third outer skin material 300 may be formed of different materials from one another.

In addition, the first outer skin material 210, the second outer skin material 220, and the third outer skin material 300 may be formed to have different thicknesses from one another.

Each of the first outer skin material 210, the second outer skin material 220, and the third outer skin material 300 may include any one of a metal foil outer skin material and a metal vapor-deposited outer skin material. Each of the first outer skin material 210 and the second outer skin material 220 may include any one of an aluminum foil outer skin material and an aluminum vapor-deposited outer skin material.

In this instance, the first and second outer skin materials 210 and 220 may be formed of the aluminum foil outer skin material, and the third outer skin material 300 may be formed of the aluminum vapor-deposited outer skin material.

For example, the first and second outer skin materials 210 and 220 may include the aluminum foil outer skin material, and the third outer skin material 300 may include the metal vapor-deposited outer skin material.

The metal vapor-deposited outer skin material includes the aluminum vapor-deposited outer skin material. The aluminum foil outer skin material has low moisture and gas permeability, but a heat bridge phenomenon (a phenomenon in which heat flows through edges of the vacuum insulation panel) may be caused, and thereby the heat insulating performance may be reduced. On the other hand, the metal vapor-deposited outer skin material may prevent the heat bridge phenomenon due to its thinner metal layer than the aluminum foil outer skin material, but have less durability due to its high moisture and gas permeability. That is, by supplementing the shortcomings of the metal vapor-deposited outer skin material and the aluminum foil outer skin material of the different materials of the vacuum insulation panel, the heat bridge phenomenon may be prevented while the durability may be improved.

In addition, the first outer skin material 210 and the second outer skin material 220 may include any one of the metal foil outer skin material, the metal vapor-deposited outer skin material, an organic coated outer skin material, an inorganic coated outer skin material, and an organic and inorganic hybrid coated outer skin material.

For example, the first outer skin material 210 and the second outer skin material 220 may be respectively formed of any one of the metal foil outer skin material, the metal vapor-deposited outer skin material, the organic coated outer skin material, the inorganic coated outer skin material, and the organic and inorganic hybrid coated outer skin material, or they may be formed as a pair having the same material.

Meanwhile, the third outer skin material 300 may be provided between the first outer skin material 210 and the second outer skin material 220 in such a manner that a gap therebetween is variable.

The third outer skin material 300 includes a first connection portion 310, which is formed to be connected to the first outer skin material 210, and a second connection portion 320, which is formed to be connected to the second outer skin material 220, and the first connection portion 310 and the second connection portion 320 may be provided to be capable of overlapping with each other.

The first connection portion 310 and the second connection portion 320 include a creased line 330 that is formed therebetween. The first connection portion 310 and the second connection portion 320 may be provided to be capable of overlapping with each other through the creased line 330. It is preferable that the first connection portion 310 and the second connection portion 320 be symmetrically formed with each other and the creased line 330 is sandwiched therebetween.

The first connection portion 310 and the second connection portion 320 may be provided to connect the first outer skin material 210 and the second outer skin material 220, and the first connection portion 310 between the first outer skin material 210 and the third outer skin material 300 and the second connection portion 320 between the second outer skin material 220 and the third outer skin material 300 may be adhered to each other at their edges by fusion or adhesion.

Next, in a receiving space S1 formed by the first outer skin material 210, the second outer skin material 220, and the third outer skin material 300, the core material 110 may be accommodated.

Meanwhile, the vacuum insulation panel 100 may further include a blocking layer 111.

The blocking layer 111 may be disposed between at least one of the first outer skin material 210 and the second outer skin material 220 and the core material 110 so as to prevent moisture and gas from penetrating into the inside of the receiving space S1.

Preferably, the blocking layer 111 may be provided on an inner surface of the outer skin material 200 at which the permeation of gas and moisture is relatively easy. That is, the blocking layer 111 may be disposed between the core material 110 and the first outer skin material 210 so as to prevent gas and moisture from passing through the first outer skin material 210 and penetrating into the inside of the receiving space S1.

The blocking layer 111 may be accommodated inside the receiving space S1 together with the core material 110, and adhered to the at least one of the first outer skin material 210 and the second outer skin material 220, and thereby integrally formed with the at least one of the first outer skin material 210 and the second outer skin material 220.

The blocking layer 111 may include at least one of a metal foil, an inorganic vapor-deposited film, and a polymer resin.

The vacuum insulation panel 100 may further include an adsorbent 113.

The adsorbent 113 excellently maintains the vacuum state inside the vacuum insulation panel 100 by adsorbing at least one of gas and moisture which exists inside the vacuum insulation panel 100 or which flows from the outside of the vacuum insulation panel 100.

The adsorbent 113 may be disposed in the receiving space S1. Specifically, the adsorbent 113 may be disposed in the receiving space S1 so as to be spaced apart from the outer skin material 200. This prevents the outer skin material 200 from being damaged by heat generated in a process in which the adsorbent 113 is activated.

The adsorbent 113 may be disposed between the core materials 110 or inserted into the core material 110.

The adsorbent 113 may be activated at a high temperature. The adsorbent 113 may be activated at the high temperature by a heat inducing device (not shown), and thereby may remove any one of gas and moisture which exists in the receiving space S1 or which has penetrated into the inside of the receiving space S1 from the outside.

The adsorbent 113 may include a metal material. Specifically, the adsorbent 113 may include at least one of an alkali metal, an alkaline earth metal, zirconium (Zr), titanium (Ti), aluminum (Al), vanadium (V), and iron (Fe).

In the adsorbent 113, calcium oxide (CaO) may be formed to be 50% or less of a weight of the vacuum insulation panel 100.

In addition, the adsorbent 113 may not effectively adsorb the at least one of gas and moisture because of a thin oxide film formed on the surface of the adsorbent 113 at room temperature, but may effectively adsorb the at least one of gas and moisture when thermal activation is caused through heating.

Preferably, the adsorbent 113 may be activated at 150° C. or higher and 800° C. or lower. In this instance, an oxide film formed on the surface of the adsorbent 113 is removed, and then the adsorbent 113 reacts with at least one of ambient gas and moisture to thereby adsorb the at least one of the ambient gas and moisture.

The adsorbent 113 may have a variety of shapes. In the embodiment of the present disclosure, the adsorbent 113 is formed in a square columnar shape, but the concept of the present disclosure is not limited thereto. For example, the adsorbent 113 may have a polygonal columnar shape or a cylindrical shape.

In addition, the adsorbent 113 may have a predetermined block shape or a rectangular parallelepiped shape.

In addition, the adsorbent 113 may be provided in the form of powder. The shape of the adsorbent 113 is not limited to the above examples, and may be variously modified.

The vacuum insulation panel 100 may further include a moisture adsorbent (not shown). The moisture adsorbent may be disposed in the receiving space S1 together with the adsorbent 113 so as to remove moisture existing in the receiving space S1. The moisture adsorbent may include at least one of CaO, magnesium carbonate (MgCO3), barium oxide (BaO), a molecular sieve, magnesium oxide (MgO), calcium chloride (CaCl2), activated carbon, a silica gel, activated alumina, and zeolite.

It is preferable that the moisture adsorbent have a specific surface area of 5 m2/g or more so as to implement excellent moisture adsorbing performance.

Meanwhile, in a manufacturing method of the vacuum insulation panel 100, outermost end portions, that is, the edges of the first outer skin material 210, the second outer skin material 220, and the third outer skin material 300, are combined together to form an envelope shape so that one side of the receiving space S1 is open.

The core material 110 is inserted into the receiving space S1 of the envelope-shaped outer skin material 200, and the open one side of each of the first outer skin material 210 and the second outer skin material 220 are combined and sealed, that is, the receiving space S1 which is in a vacuum state is formed.

In this instance, the first connection portion 310 and the second connection portion 320 of the third outer skin material 300 may be moved in an inward direction (a C direction) of the first outer skin material 210 and the second outer skin material 220 with respect to the creased line 330 and compressed.

In this manner, at least a part of the first connection portion 310 and the second connection portion 320 may be overlapped with each other by the creased line 330 which is moved in the inward direction (the C direction), and such movement of the first connection portion 310 and the second connection portion 320 may enable a length between the first connection portion 310 and the second connection portion 320 to be variable.

The size of the inside of the receiving space S1 in which the core material 110 is inserted may vary by the deformation of the first connection portion 310 and the second connection portion 320.

Accordingly, even when the thickness of the core material 110 is thick, the core material 110 may be easily inserted into the receiving space S1 formed by the first outer skin material 210, the second outer skin material 220, and the third outer skin material 300.

Figure 9:
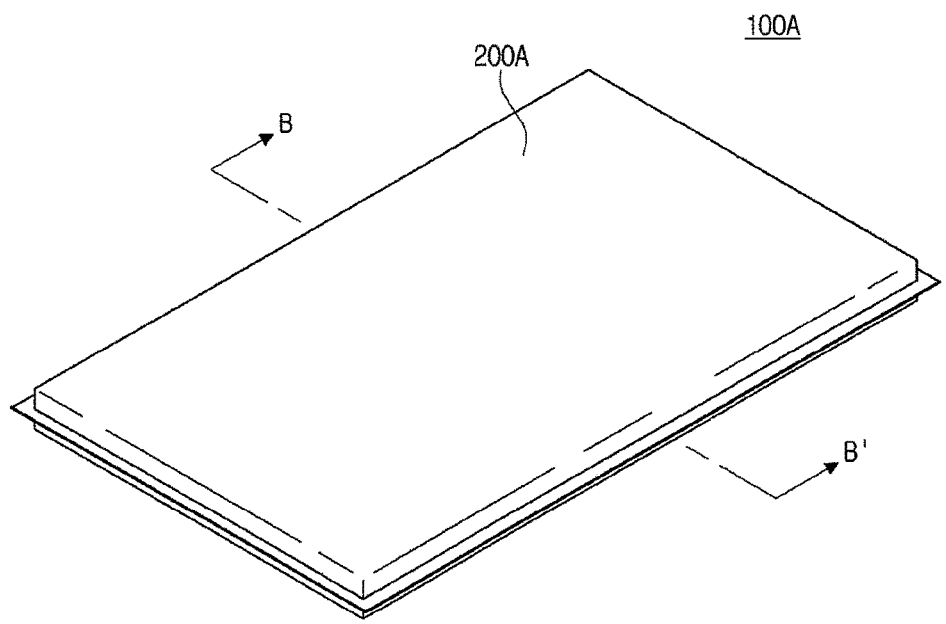
FIG. 9 is a perspective view showing a vacuum insulation panel in accordance with another embodiment of the present disclosure.
Figure 10:
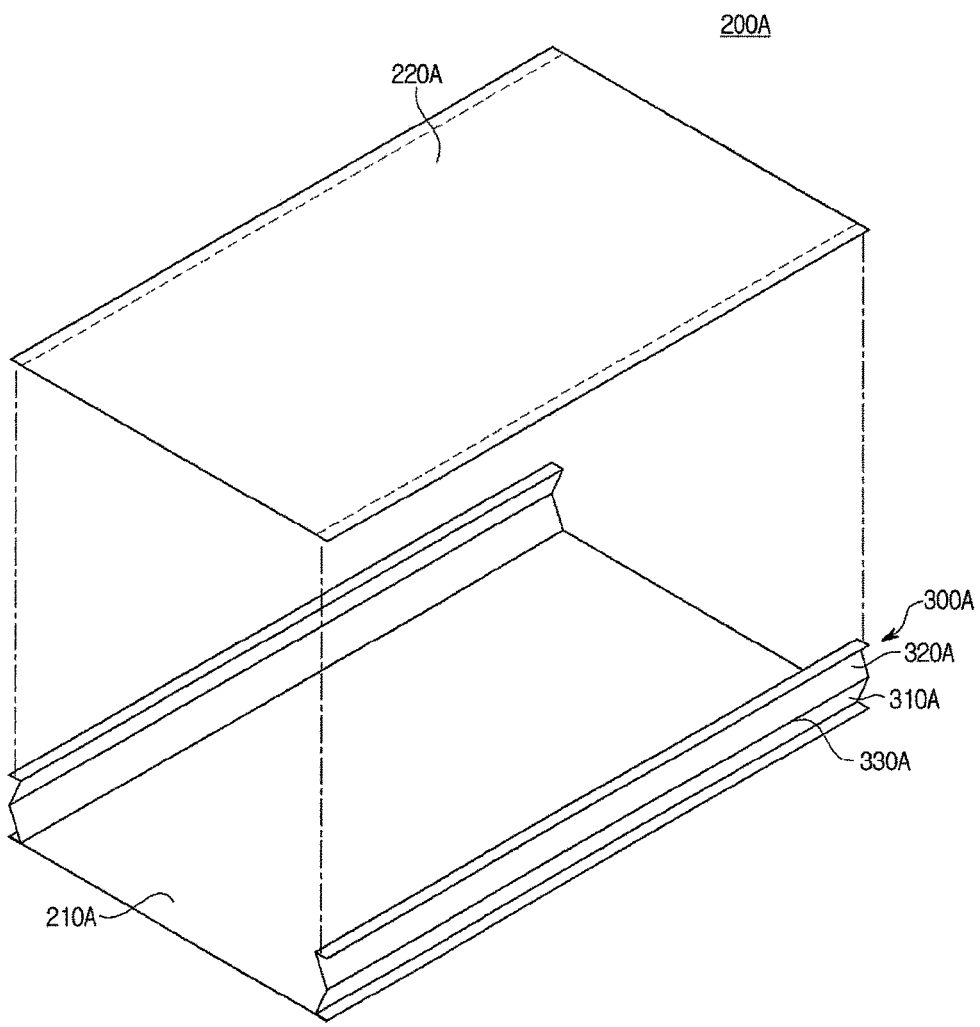
FIG. 10 is a view showing a pre-coupling state of an outer skin material of a vacuum insulation panel in accordance with another embodiment of the present invention.
Figure 11:
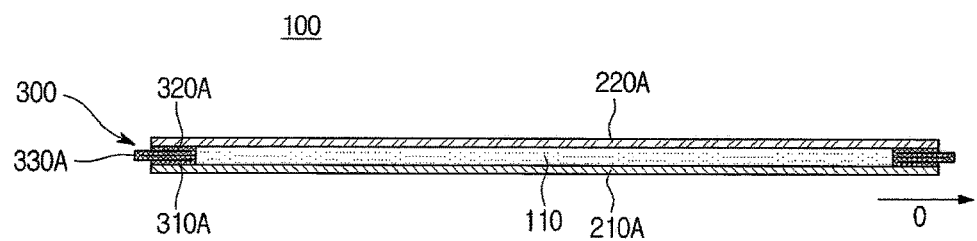
FIG. 11 is a cross-sectional view taken along line B-B' of FIG. 9.

FIG. 9 is a perspective view showing a vacuum insulation panel in accordance with another embodiment of the present disclosure, FIG. 10 is a view showing a pre-coupling state of an outer skin material of a vacuum insulation panel in accordance with another embodiment of the present invention, and FIG. 11 is a cross-sectional view taken along line B-B' of FIG. 9.

As shown in FIGS. 9 to 11, an outer skin material 200A of a vacuum insulation panel 100A includes a first outer skin material 210A, a second outer skin material 220A, and a third outer skin material 300A.

The first outer skin material 210A is disposed on one surface of the core material 110, and the second outer skin material 220A is disposed on the other surface thereof so as to face the first outer skin material 210A. The first outer skin material 210A and the second outer skin material 220A may include films having different materials. That is, the materials of the first outer skin material 210A and the second outer skin material 220A may be different from each other.

The first outer skin material 210A and the second outer skin material 220A may be formed of the same material.

The first outer skin material 210A and the second outer skin material 220A may include any one of a metal foil outer skin material, a metal vapor-deposited outer skin material, an organic coated outer skin material, an inorganic coated outer skin material, and an organic and inorganic hybrid coated outer skin material.

The first outer skin material 210A and the second outer skin material 220A may be formed individually or as a pair of the metal foil outer skin material, the metal vapor-deposited outer skin material, the organic coated outer skin material, the inorganic coated outer skin material, and the organic and inorganic hybrid coated outer skin material.

The first outer skin material 210A, the second outer skin material 220A, and the third outer skin material 300A may be formed of different materials from one another.

In addition, the first outer skin material 210A, the second outer skin material 220A, and the third outer skin material 300A may have different thicknesses from one another.

The third outer skin material 300A may be provided between the first outer skin material 210A and the second outer skin material 220A in such a manner that a gap therebetween is variable.

The third outer skin material 300A includes a first connection portion 310A, which is formed to be connected to the first outer skin material 210A, and a second connection portion 320A, which is formed to be connected to the second outer skin material 220A, and the first connection portion 310A and the second connection portion 320A may be provided to be capable of overlapping with each other.

The first connection portion 310A and the second connection portion 320A include a creased line 330A that is formed therebetween. The first connection portion 310 and the second connection portion 320 may be provided to be capable of overlapping with each other through the creased line 330. It is preferable that the first connection portion 310A and the second connection portion 320A be symmetrically formed with each other and the creased line 330A is sandwiched therebetween.

The first connection portion 310A and the second connection portion 320A may be provided to connect the first outer skin material 210A and the second outer skin material 220A, and the first connection portion 310A between the first outer skin material 210A and the third outer skin material 300A and the second connection portion 320A between the second outer skin material 220A and the third outer skin material 300A may be adhered to each other at their edges by fusion or adhesion.

Next, the core material 110 may be inserted and accommodated in a receiving space S2 formed by the first outer skin material 210A, the second outer skin material 220A, and the third outer skin material 300A.

Meanwhile, the first connection portion 310A and the second connection portion 320A of the third outer skin material 300A may be moved in an outward direction (an O direction) of the first outer skin material 210A and the second outer skin material 220A with respect to the creased line 330A.

In this manner, in the third outer skin material 300A, at least a part of the first connection portion 310A and the second connection portion 320A may be overlapped with each other by the creased line 330A which is moved in the outward direction (the O direction), and such deformation of the first connection portion 310A and the second connection portion 320A may enable a length between the first connection portion 310A and the second connection portion 320A to be variable.

Accordingly, the size of the inside of the receiving space S2 in which the core material 110 is inserted may vary by the deformation of the first connection portion 310A and the second connection portion 320A. That is, even when the thickness of the core material 110 is thick, the core material 110 may be easily inserted into the receiving space S2 formed by the first outer skin material 210A, the second outer skin material 220A, and the third outer skin material 300A.

Meanwhile, in a manufacturing method of the vacuum insulation panel 100 that is configured to include such a third outer skin material 300A, outermost end portions, that is, the edges of the first outer skin material 210A, the second outer skin material 220A, and the third outer skin material 300A, are combined together to form an envelope shape.

In this instance, one side of the receiving space S2 may be open.

The core material 110 is inserted into the inner receiving space S2 of the envelope-shaped outer skin material 200A, and the open one side of each of the first outer skin material 210A and the second outer skin material 220A are combined and sealed, that is, the vacuum insulation panel 100A which is in a vacuum state is formed.

The vacuum insulation panel 100A may further include a blocking layer 111 that is provided to prevent moisture and gas from penetrating into the inside of the receiving space S2, and an adsorbent 113 for excellently maintaining the vacuum state inside the vacuum insulation panel 100A by adsorbing at least one of gas and moisture which exist inside the vacuum insulation panel 100A or flow from the outside of the vacuum insulation panel 100A.

Figure 12:
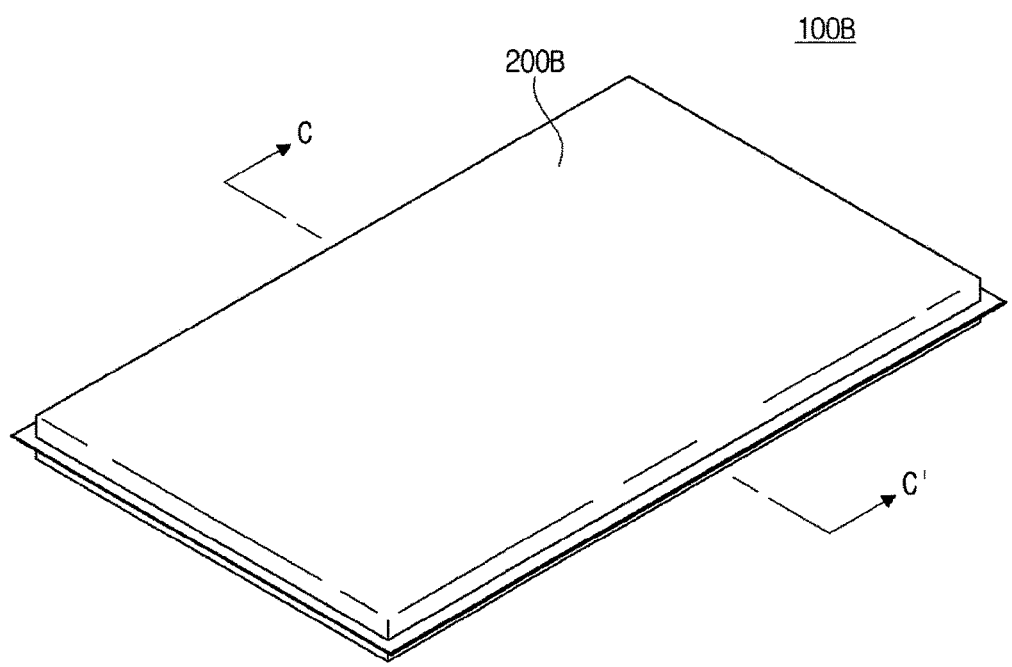
FIG. 12 is a perspective view showing an outer skin material of a vacuum insulation panel in accordance with yet another embodiment of the present disclosure.
Figure 13:
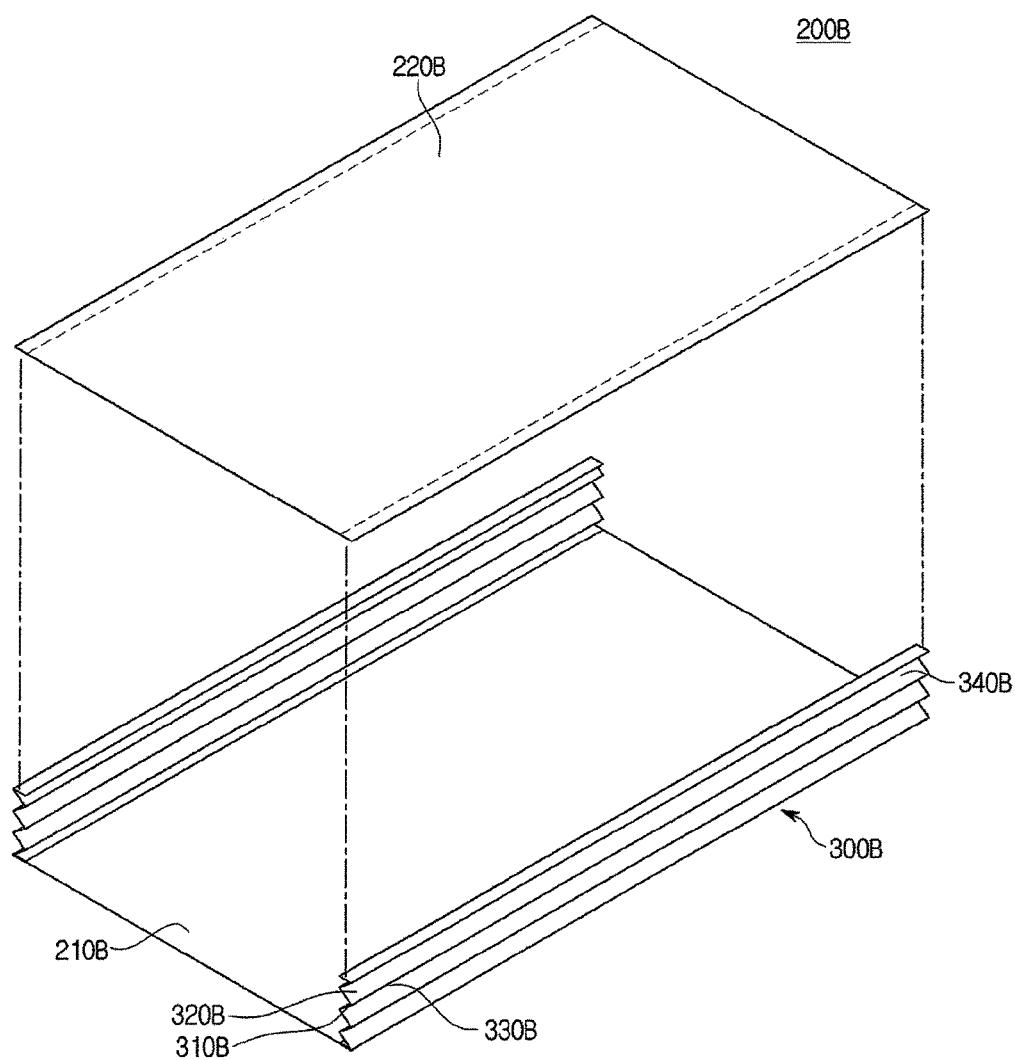
FIG. 13 is an exploded perspective view showing an outer skin material of a vacuum insulation panel in accordance with yet another embodiment of the present disclosure.
Figure 14:
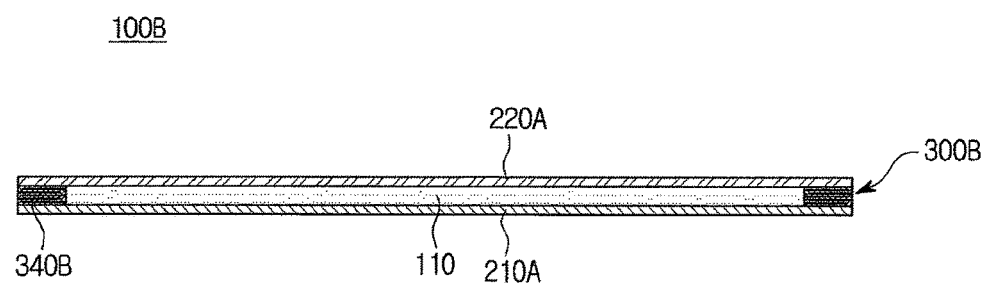
FIG. 14 is a cross-sectional view taken along line C-C' of FIG. 12.

FIG. 12 is a perspective view showing an outer skin material of a vacuum insulation panel in accordance with still another embodiment of the present disclosure, FIG. 13 is an exploded perspective view showing an outer skin material of a vacuum insulation panel in accordance with yet another embodiment of the present disclosure, and FIG. 14 is a cross-sectional view taken along line C-C' of FIG. 12.

As shown in FIGS. 12 to 14, an outer skin material 200B of a vacuum insulation panel 100B includes a first outer skin material 200B, a second outer skin material 220B, and a third outer skin material 300B.

The first outer skin material 210B is disposed on one surface of a core material 110, and the second outer skin material 220B is disposed on the other surface thereof so as to face the first outer skin material 210B. The first outer skin material 210B and the second outer skin material 220B may include films having different materials. That is, the materials of the first outer skin material 210B and the second outer skin material 220B may be different from each other.

The first outer skin material 210B and the second outer skin material 220B may be formed of the same material.

The first outer skin material 210B, the second outer skin material 220B, and the third outer skin material 300B may be formed of different materials from one another.

In addition, the first outer skin material 210B, the second outer skin material 220B, and the third outer skin material 300B may be formed to have different thicknesses from one another.

The third outer skin material 300B may be provided between the first outer skin material 210B and the second outer skin material 220B in such a manner that a gap therebetween is variable.

The third outer skin material 300B includes one or more creased lines 330B. A first connection portion 310B is disposed at one side of the third outer skin material 300B, and a second connection portion 320B is disposed at the other side thereof by sandwiching the creased line 330B therebetween.

In this instance, at least one of the first connection portion 310B and the second connection portion 320B are laminated to form a wrinkled portion 340B.

The first connection portion 310B and the second connection portion 320B which form the wrinkled portion 340B are provided to be capable of overlapping with each other with respect to the creased line 330B formed therebetween. It is preferable that the first connection portion 310B and the second connection portion 320B be symmetrically formed with each other and the creased line 330B is sandwiched therebetween.

Meanwhile, the third outer skin material 330B may be adhered to the first outer skin material 210B and the second outer skin material 220B at its edge by fusion or adhesion.

In a receiving space S3 formed by the first outer skin material 210B, the second outer skin material 220B, and the third outer skin material 300B, the core material 110 is inserted and accommodated.

In this manner, in the third outer skin material 300B, at least a part of the first connection portion 310B and the second connection portion 320B may be overlapped with each other by the wrinkled portion 340B, and such deformation of the first connection portion 310B and the second connection portion 320B may enable a height between the first connection portion 310B and the second connection portion 320B to be variable.

Accordingly, a size of the inside of the receiving space S3 in which the core material 110 is inserted may vary by the deformation of the first connection portion 310B and the second connection portion 320B. That is, even when the thickness of the core material 110 is thick, the core material 110 may be easily inserted into the receiving space S3 formed by the first outer skin material 210B, the second outer skin material 220B, and the third outer skin material 300B.

In a manufacturing method of the vacuum insulation panel 100B that is configured to include such a third outer skin material 300B, outermost end portions, that is, the edges of the first outer skin material 210B, the second outer skin material 220B, and the third outer skin material 300B, are combined together to form an envelope shape.

In this instance, one side of the receiving space S3 may be open.

The core material 110 is inserted into the inner receiving space S3 of the envelope-shaped outer skin material 200B, and the open one side of each of the first outer skin material 210B and the second outer skin material 220B are combined and sealed, that is, the vacuum insulation panel 100B which is in a vacuum state is formed.

Figure 15:
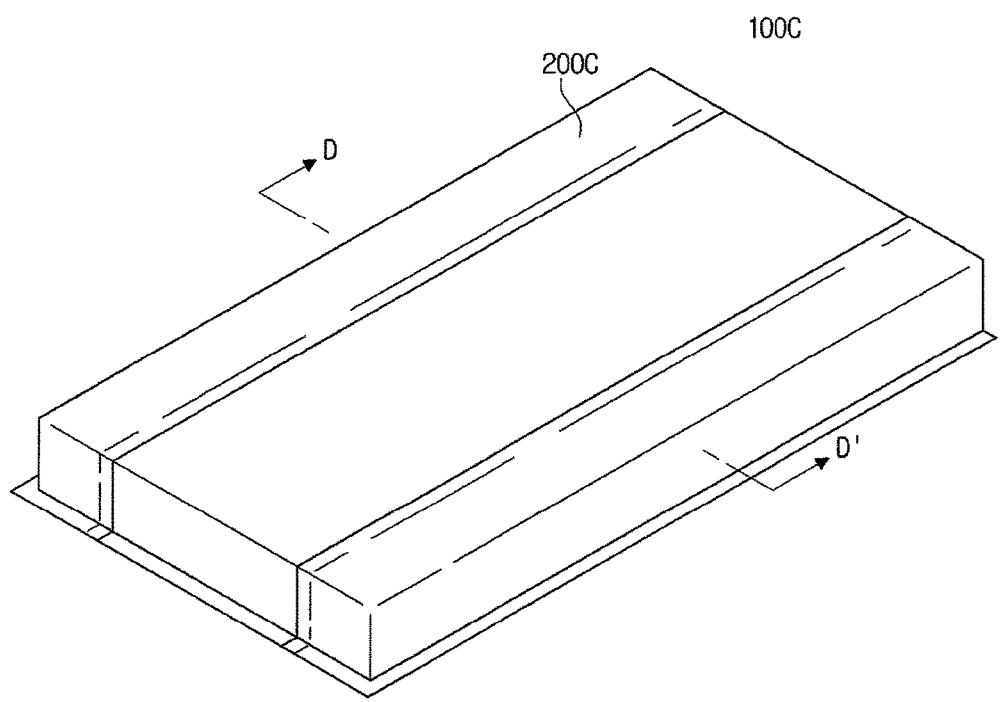
FIG. 15 is a perspective view showing a vacuum insulation panel in accordance with yet another embodiment of the present invention.
Figure 16:
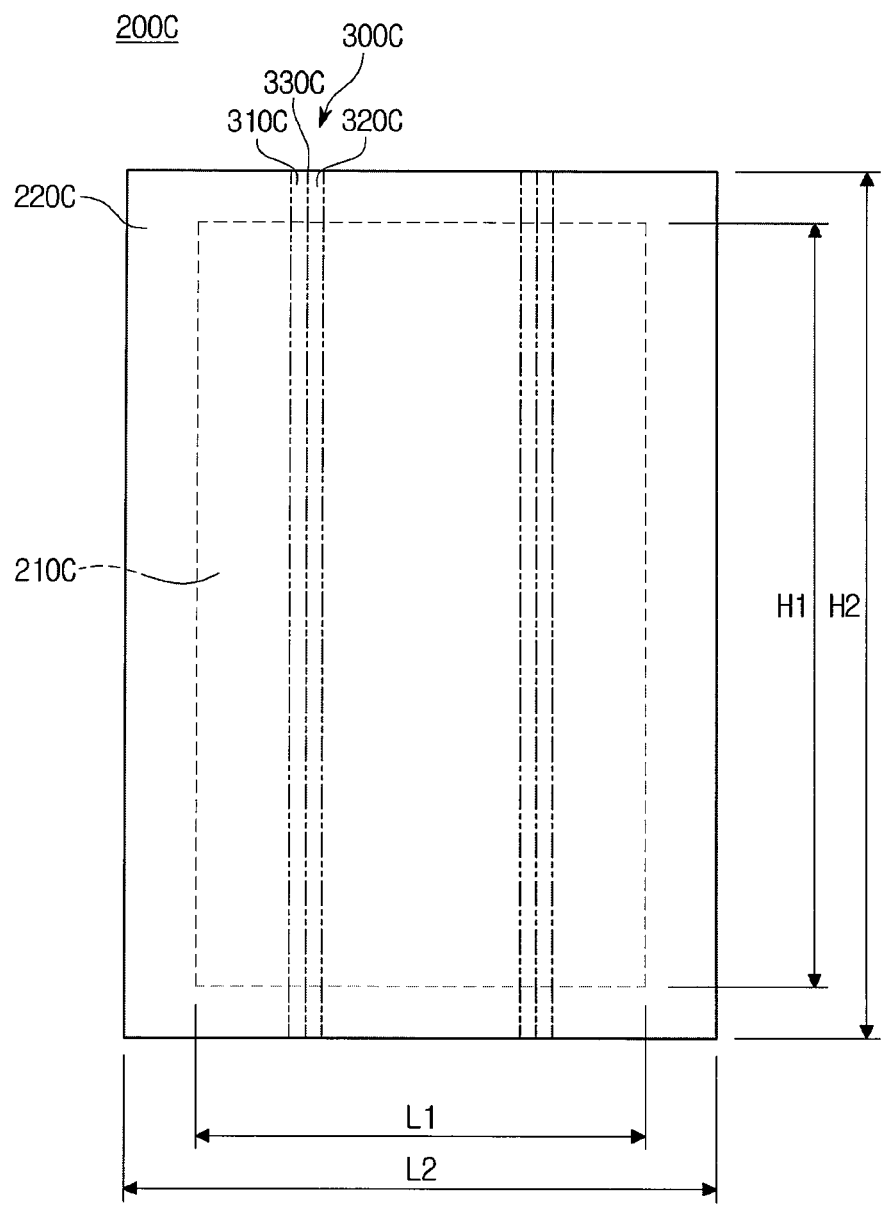
FIG. 16 is a view showing an outer skin material of a vacuum insulation panel in accordance with yet another embodiment of the present invention.
Figure 17:
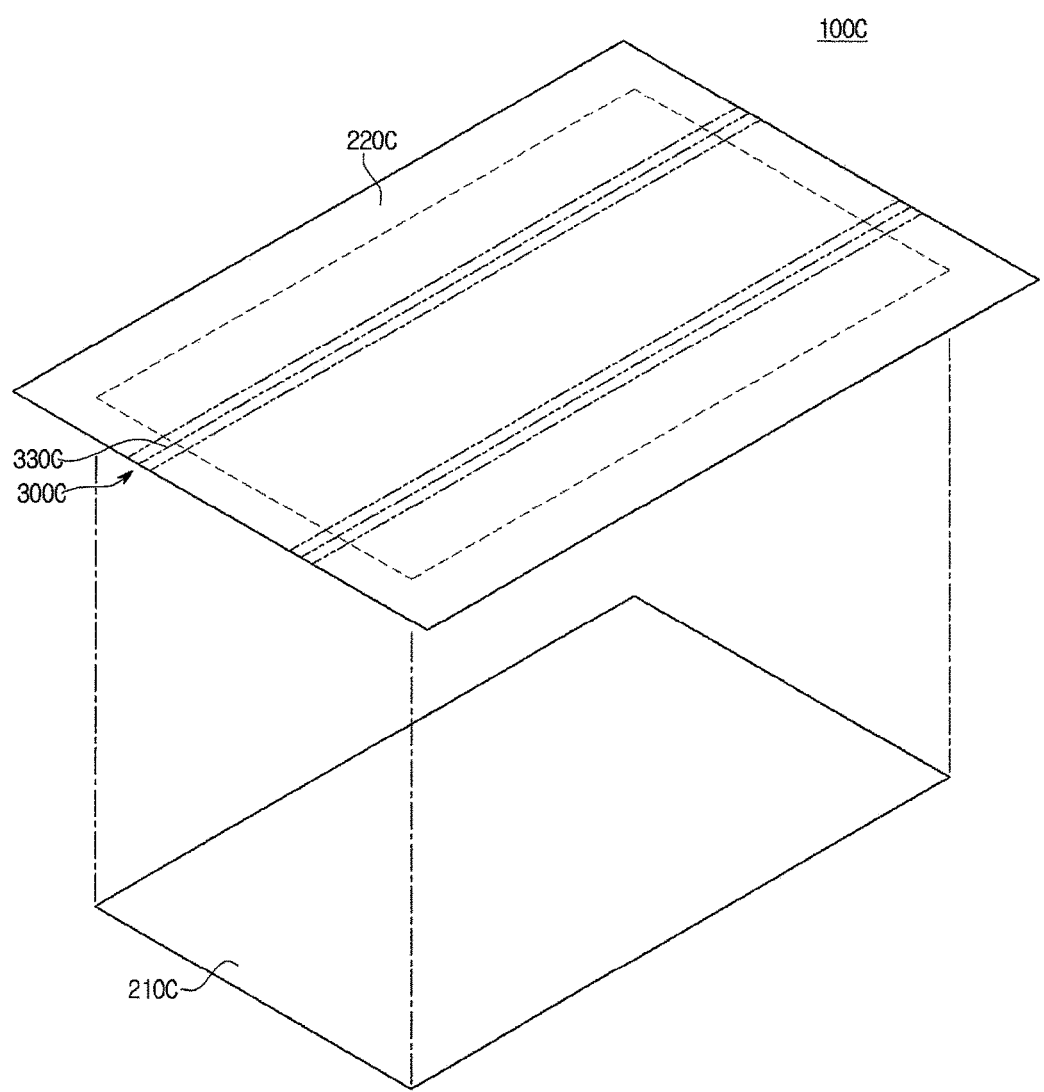
FIG. 17 is a view showing a pre-coupling state of an outer skin material of a vacuum insulation panel in accordance with yet another embodiment of the present disclosure.
Figure 18:
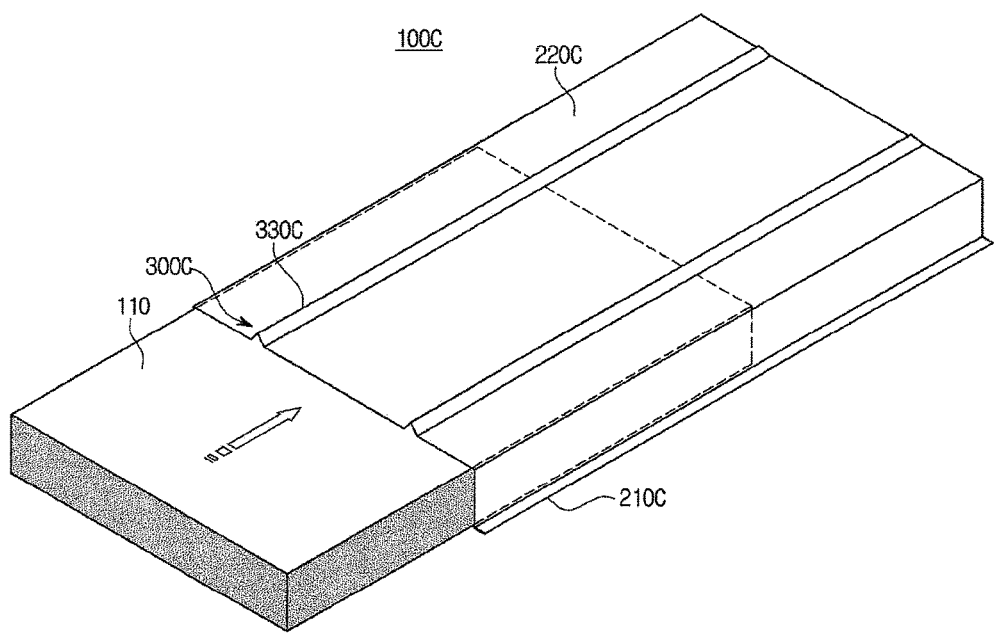
FIG. 18 is a view showing a state in which a core material is inserted into an outer skin material of a vacuum insulation panel in accordance with yet another embodiment of the present disclosure.
Figure 19:
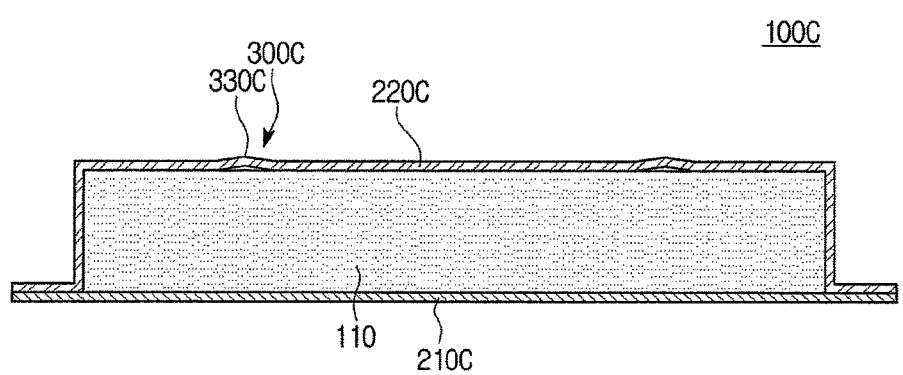
FIGS. 19 and 20 are schematic views showing a deformed state of an outer skin material of a vacuum insulation panel in accordance with yet another embodiment of the present disclosure.
Figure 20:
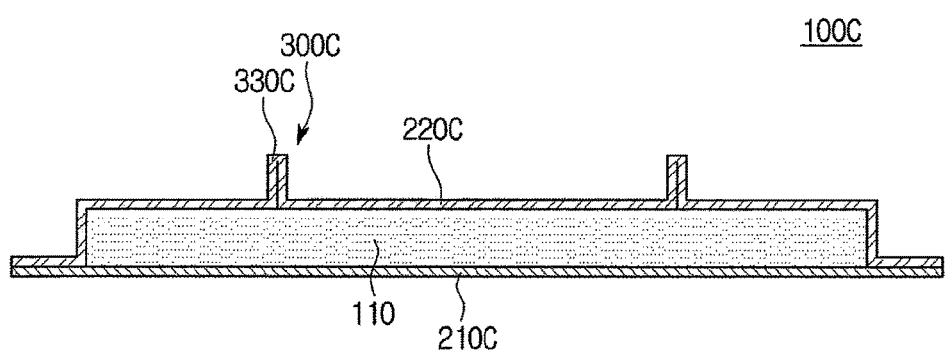
Figure 21:
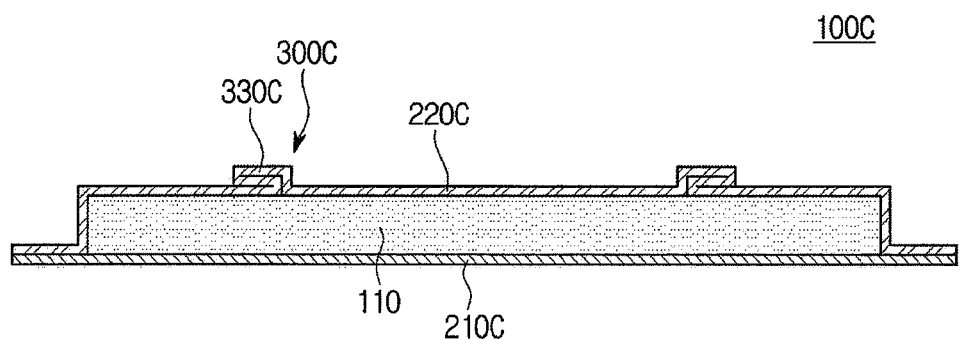
FIG. 21 is a cross-sectional view taken along line D-D' of FIG. 15.

FIG. 15 is a perspective view showing a vacuum insulation panel in accordance with yet another embodiment of the present invention, FIG. 16 is a view showing an outer skin material of a vacuum insulation panel in accordance with yet another embodiment of the present invention, FIG. 17 is a view showing a pre-coupling state of an outer skin material of a vacuum insulation panel in accordance with yet another embodiment of the present disclosure, FIG. 18 is a view showing a state in which a core material is inserted into an outer skin material of a vacuum insulation panel in accordance with yet another embodiment of the present disclosure, FIGS. 19 and 20 are schematic views showing a deformed state of an outer skin material of a vacuum insulation panel in accordance with yet another embodiment of the present disclosure, and FIG. 21 is a cross-sectional view taken along with a line D-D' of FIG. 15.

As shown in FIGS. 15 to 21, a vacuum insulation panel 100C includes an outer skin material 200C and a core material 110 that is provided to be accommodated into the outer skin material 200C.

The outer skin material 200C includes a first outer skin material 210C and a second outer skin material 220C.

The first outer skin material 210C is disposed on one surface of the core material 110, and the second outer skin material 220C is disposed on the outer surface thereof. The second outer skin material 220C is combined with the first outer skin material 210C to form a receiving space S4 in which the core material 110 is accommodated.

The sizes of the first outer skin material 210C and the second outer skin material 220C may be different from each other.

In this instance, the kinds of the first outer skin material 210C and the second outer skin material 220C may be different from each other. The first outer skin material 210C and the second outer skin material 220C may be formed to have different thicknesses from each other.

Each of the first outer skin material 210C and the second outer skin material 220C may include any one of a metal foil outer skin material and a metal vapor-deposited outer skin material.

Each of the first outer skin material 210C and the second outer skin material 220C may include any one of an aluminum foil outer skin material and an aluminum vapor-deposited outer skin material.

In this instance, the first outer skin material 210C may be formed of the aluminum foil outer skin material, and the second outer skin material 220C may be formed of the aluminum vapor-deposited outer skin material.

Each of the first outer skin material 210C and the second outer skin material 220C may include any one of a metal foil outer skin material, a metal vapor-deposited outer skin material, an organic coated outer skin material, an inorganic coated outer skin material, and an organic and inorganic hybrid coated outer skin material.

The first outer skin material 210C and the second outer skin material 220C may be formed individually or as a pair of the metal foil outer skin material, the metal vapor-deposited outer skin material, the organic coated outer skin material, the inorganic coated outer skin material, and the organic and inorganic hybrid coated outer skin material.

Meanwhile, the second outer skin material 220C may be provided in such a manner that a gap between the second outer skin material 220C and the first outer skin material 210C may be variable.

The second outer skin material 220C includes a variable creased portion 300C so as to correspond to the size of the first outer skin material 210C.

A width L2 and a height H2 of the second outer skin material 220C are formed longer than a width L1 and a height H1 of the first outer skin material 210C.

The creased portion 300C may be formed long in a longitudinal direction of the second outer skin material 220C, that is, in a vertical direction. The creased portion 300C is formed on the same surface as the second outer skin material 220C. The creased portion 300C includes a first connection portion 310C, a second connection portion 320C, and a creased line 330C that is formed between the first connection portion 310C and the second connection line 320C.

A plurality of creased portions 300C may be formed in accordance with the size of the second outer skin material 200C. In the embodiment of the present disclosure, two creased portions 300C are disposed to be spaced apart from each other by a predetermined distance, but the spirit of the present disclosure is not limited thereto. For example, a plurality of creased portions 300C may be formed in accordance with the size and shape of the vacuum insulation panel 100C.

The first connection portion 310C and the second connection portion 320C may be formed to be movable in the vertical direction with respect to the creased line 330C.

The creased line 330C may be positioned to protrude in an upward direction of the second outer skin material 220C. In this instance, the first connection portion 310C and the second connection portion 320C may be moved in a central direction with respect to the creased line 330C to be overlapped with each other.

In this manner, when the first connection portion 310C and the second connection portion 320C are moved in the central direction, the width L2 of the second outer skin material 220C may be variable.

The width L2 of the second outer skin material 220C may correspond to the width L1 of the first outer skin material 210C, and may be variable.

Accordingly, the size of the receiving space S4 formed by the first outer skin material 210C and the second outer skin material 220C may be variable by the creased portion 300C of the second outer skin material 220C, so that the thick core material 110 may be inserted into the receiving space S4.

Meanwhile, the first connection portion 310C and the second connection portion 320C of the creased portion 300C may be overlapped with each other to be integrally formed and adhered to an outer surface of the second outer skin material 220C after a vacuum exhausting process.

In a manufacturing method of the vacuum insulation panel 100C, outermost end portions, that is, edges of the first outer skin material 210C and the second outer skin material 220C, are fused and adhered to each other to form an envelope shape.

In this instance, the creased portion 300C of the second outer skin material 220C may be coupled to a rear end portion of the first outer skin material 210C in a state in which end portions of the creased portion 300C of the second outer skin material 220C are overlapped with each other in advance.

The receiving space S4 formed between the first outer skin material 210C and the second outer skin material 220C may be variable by the creased portion 300C. The size of the inner receiving space S4 in which the core material 110 is inserted may vary by the deformation of the first connection portion 310 and the second connection portion 320 of the creased portion 300C.

Accordingly, even when the thickness of the core material 110 is thick, the core material 110 may be easily inserted into the receiving space S4 formed to be variable between the first outer skin material 210C and the second outer skin material 220C.

The core material 110 is inserted into the inner receiving space S4 of the envelope-shaped outer skin material 200C, and an open one side of each of the first outer skin material 210C and the second outer skin material 220C is subjected to heat fusion after vacuum exhausting, thereby forming the vacuum insulation panel 100C.

In addition, the second connection portion 320C adhered to the first connection portion 310C of the creased portion 300C may be fused to the surface of the second outer skin material 220C through heat treatment.

According to the embodiments of the present disclosure, the occurrence of minute fin holes or cracks of the edges or corners of a vacuum insulation panel can be prevented by minimizing the folding process, resulting in a reduction in costs.

In addition, a defect caused by compression of a core material may be reduced, and thus the durability and the quality of the product can be improved.

In addition, a vacuum insulation panel which is thin and has excellent heat insulating performance may be used between an outer case and an inner case of a refrigerator, and thus a storage capacity of the refrigerator can be increased while implementing a slim design of the refrigerator.

Although a few embodiments of the present disclosure have been shown and described, it should be appreciated by those skilled in the art that changes may be made in these embodiments without departing from the principles and spirit of the disclosure, the scope of which is defined in the claims and their equivalents.

What is claimed is:

1. A vacuum insulation panel comprising:
    a core material;
    a first outer skin material that is disposed to form an outer surface of the core material;
    a second outer skin material that has a gap from the first outer skin material and forms an other outer surface of the core material, and is disposed to face the first outer skin material; and
    a third outer skin material that is provided to connect the first outer skin material and the second outer skin material and to be variable in accordance with the gap,
    wherein the first outer skin material, the second outer skin material, and the third outer skin material are each formed of a different material, and are coupled to each other.

2. The vacuum insulation panel according to claim 1, wherein the third outer skin material includes a first connection portion that is formed to be connected to the first outer skin material and a second connection portion that is formed to be connected to the second outer skin material, and the first connection portion and the second connection portion are provided to be overlapped with each other.

3. The vacuum insulation panel according to claim 2, wherein the first connection portion and the second connection portion include a creased line that is formed therebetween.

4. The vacuum insulation panel according to claim 3, wherein the creased line is provided to be positioned at any one of an inward direction and an outward direction of the first outer skin material and the second outer skin material.

5. The vacuum insulation panel according to claim 3, wherein the third outer skin material is formed as a pair so as to form at least two side surfaces of a plurality of surfaces.

6. The vacuum insulation panel according to claim 1, wherein the third outer skin material includes a wrinkled portion.

7. The vacuum insulation panel according to claim 1, wherein the third outer skin material includes at least one of a metal foil outer skin material and a metal vapor-deposited outer skin material.

8. The vacuum insulation panel according to claim 1, wherein the first outer skin material and the second outer skin material include any one of a metal foil outer skin material, a metal vapor-deposited outer skin material, an organic coated outer skin material, an inorganic coated outer skin material, and an organic and inorganic hybrid coated outer skin material.

9. The vacuum insulation panel according to claim 1, wherein the first outer skin material includes any one of a metal foil outer skin material, a metal vapor-deposited outer skin material, an organic coated outer skin material, an inorganic coated outer skin material, and an organic and inorganic hybrid coated outer skin material.

10. The vacuum insulation panel according to claim 1, wherein the second outer skin material includes any one of a metal foil outer skin material, a metal vapor-deposited outer skin material, an organic coated outer skin material, an inorganic coated outer skin material, and an organic and inorganic hybrid coated outer skin material.

11. The vacuum insulation panel according to claim 1, wherein the core material includes any one of organic fibers and inorganic fibers.

12. The vacuum insulation panel according to claim 1, wherein a length of fibers in the core material is in a range of 0.1 to 300 mm, and a diameter of the fibers in the core material is in a range of 0.1 to 10 um.

13. The vacuum insulation panel according to claim 1, further comprising:
    an adsorbent that is provided inside the core material and adsorbs at least one of gas and moisture flowing into the core material.

14. The vacuum insulation panel according to claim 13, wherein in the adsorbent, calcium oxide (CaO) is included at 50% or less of a weight of the vacuum insulation panel.

15. The vacuum insulation panel according to claim 13, wherein the first outer skin material, the second outer skin material, and the third outer skin material are adhered to one another by fusion or adhesion.

16. A vacuum insulation panel comprising:
    a core material;
    a first outer skin material that is disposed outside the core material; and
    a second outer skin material that is coupled to the first outer skin material to form a receiving space inside of which the core material is accommodated,
    wherein the second outer skin material is formed with a different size from a size of the first outer skin material, and includes a creased portion that is provided to enable the size of the second outer skin material to be variable.

17. The vacuum insulation panel according to claim 16, wherein the first outer skin material and the second outer skin material are adhered to each other along edges of the first outer skin material by fusion or adhesion.

18. The vacuum insulation panel according to claim 16, wherein the creased portion includes a first connection portion, a second connection portion that is connected to the first connection portion, and a creased line that is formed between the first connection portion and the second connection portion.

19. The vacuum insulation panel according to claim 18, wherein the first connection portion and the second connection portion are formed so as to be overlapped with each other with respect to the creased line.

20. The vacuum insulation panel according to claim 19, wherein the creased line is positioned outside the second outer skin material.

* * * * *